(12) United States Patent
Angenendt et al.

(10) Patent No.: US 6,817,158 B2
(45) Date of Patent: Nov. 16, 2004

(54) LIGHTWEIGHT CONSTRUCTION BOARD

(75) Inventors: Peter Angenendt, Vlotho (DE);
Karsten Walter, Bad Münder (DE);
Heinrich Iglseder, Im Fasanenkamp 10,
31552 Rodenberg (DE)

(73) Assignee: Heinrich Iglseder, Rodenberg (DE)

( * ) Notice: Subject to any disclaimer, the term of this patent is extended or adjusted under 35 U.S.C. 154(b) by 11 days.

(21) Appl. No.: 10/110,580

(22) PCT Filed: Dec. 5, 2000

(86) PCT No.: PCT/EP00/12218

§ 371 (c)(1),
(2), (4) Date: Sep. 19, 2002

(87) PCT Pub. No.: WO01/44613

PCT Pub. Date: Jun. 21, 2001

(65) Prior Publication Data

US 2003/0163972 A1 Sep. 4, 2003

(30) Foreign Application Priority Data

Dec. 14, 1999 (DE) .......................... 199 60 304

(51) Int. Cl.[7] .............................. E04B 3/72; E04C 2/34
(52) U.S. Cl. .................... 52/793.1; 52/783.1; 52/223.6; 52/784.14
(58) Field of Search .......................... 52/784.14, 793.1, 52/784.1, 783.1, 223.6; 428/116

(56) References Cited

U.S. PATENT DOCUMENTS

| | | | | |
|---|---|---|---|---|
| 937,430 | A | * 10/1909 | Evans, Jr. ................ | 52/784.14 |
| 4,084,366 | A | * 4/1978 | Saylor et al. ............... | 52/791.1 |
| 4,421,811 | A | * 12/1983 | Rose et al. .................. | 428/116 |
| 4,468,423 | A | * 8/1984 | Hall ............................ | 428/72 |
| 4,529,640 | A | * 7/1985 | Brown et al. ................ | 428/116 |
| 4,567,076 | A | * 1/1986 | Therrien ..................... | 428/102 |
| 4,937,125 | A | * 6/1990 | Sanmartin et al. .......... | 428/116 |
| 5,191,704 | A | * 3/1993 | McCarty .................. | 29/897.32 |
| 5,460,865 | A | * 10/1995 | Tsotsis ....................... | 428/116 |
| 5,522,195 | A | 6/1996 | Bargen | |
| 5,667,866 | A | * 9/1997 | Reese, Jr. ................... | 428/116 |
| 5,875,596 | A | * 3/1999 | Muller ....................... | 52/239 |

FOREIGN PATENT DOCUMENTS

| | | |
|---|---|---|
| DE | 297 19 080 U | 2/1998 |
| EP | 0 103 048 A | 3/1984 |
| EP | 0 853 183 A | 7/1998 |
| FR | 751 620 A | 9/1933 |
| GB | 1 332 551 A | 10/1973 |
| NL | 7 409 769 A | 1/1976 |

* cited by examiner

*Primary Examiner*—Brian E. Glessner
(74) *Attorney, Agent, or Firm*—Muramatsu & Associates

(57) ABSTRACT

A light construction panel having excellent outer appearance and high persistent against deformation is disclosed. The light construction panel is formed with an outer frame and a core, the frame and the core having the same material thickness, and also with an upper and a lower cover sheet which cover the frame and the core. The core consists of an inner part made from light construction material and an upper and lower sealing layer. Such a panel is distinguished by a particular rigidity. Moreover the transition between frame and core no longer shows on the surface of the panel.

17 Claims, 2 Drawing Sheets

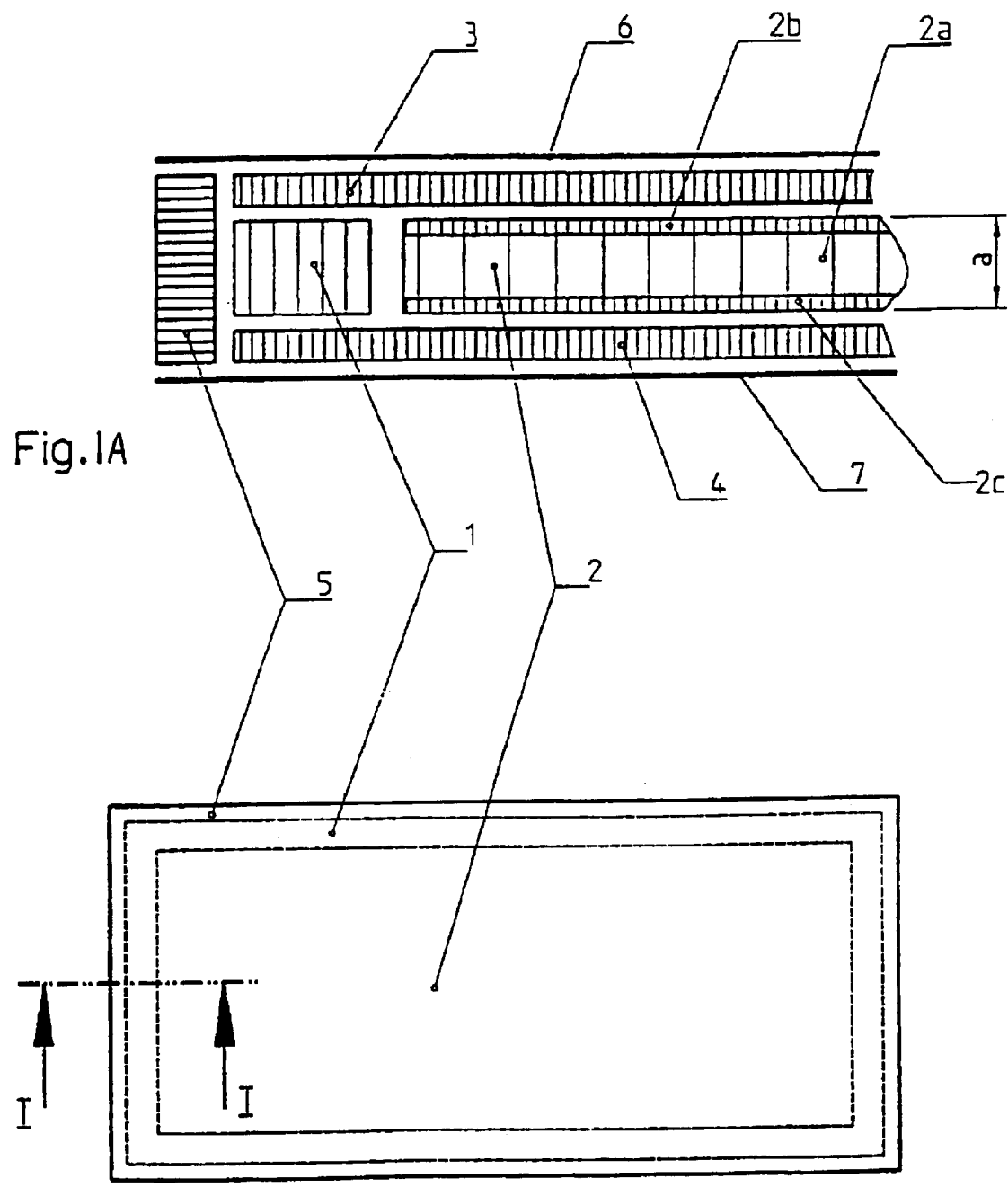

LIGHTWEIGHT CONSTRUCTION BOARD

Figure 1B:
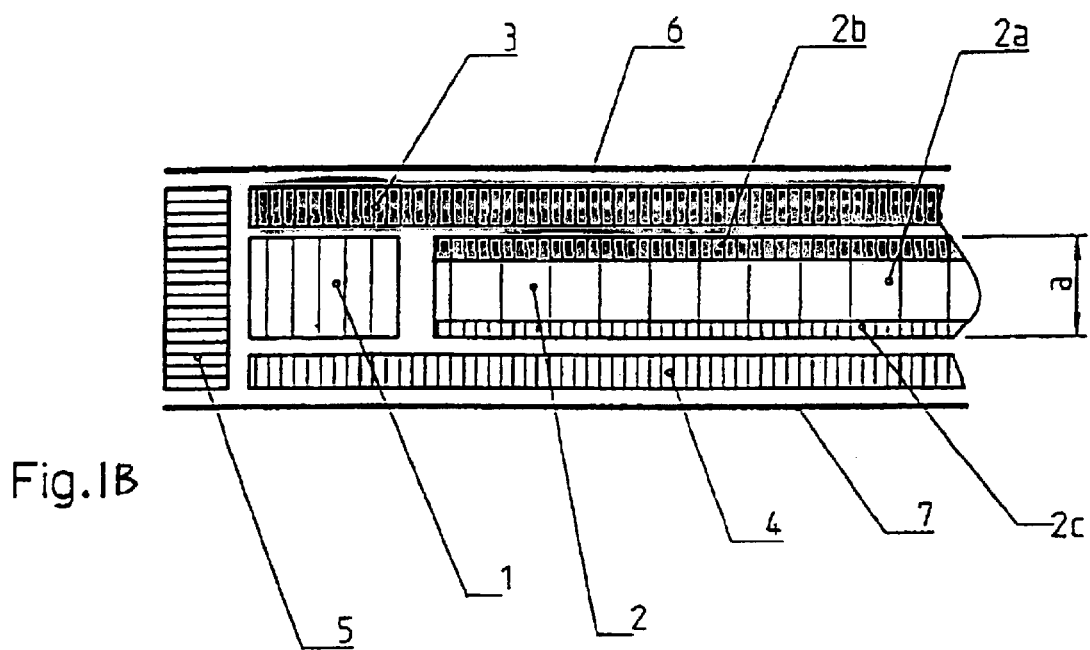

The invention relates to a light construction panel with an outer frame and a core, the frame and the core having the same material thickness, and also with an upper and a lower cover sheet which cover the frame and the core.

A structural element in panel form which is known from DE-AS-1 016 428 has a core with a conventional wooden frame on which a sealing veneer is applied on both sides. The sealing veneers are provided on at least one side edge with attached veneer strips of the same material thickness, the grain of which runs in the same direction as that of the cover veneers. In this way there are practically no visible differences between the superimposed veneers on the front edge. Such structural elements are used for example for doors, furniture parts, joinery panels or the like.

However, in the case of a particularly high-quality surface such a panel construction has the disadvantage that the transition from frame to core shows visibly on the cover veneers.

Furthermore it has been shown that such panels have a relatively great persistent deformation after a static loading.

The object of the invention therefore is to provide a light construction panel which has an increased stability and in which moreover the transition between frame and core no longer shows on the surface of the panel.

This object is achieved according to the invention by the features of claim 1.

Further embodiments of the invention are the subject matter of the subordinate claims.

According to the invention the core is formed from an inner part made from light construction material and an upper and lower sealing layer. The frame and the core, which both have the same material thickness, are then covered with an upper and a lower cover sheet.

In a preferred embodiment the sealing layers of the core and the cover sheets are made from the same material. Moreover a particularly high stability of the panel can be achieved if the frame is made from plywood.

Further embodiments and advantages of the invention are explained in greater detail with reference to the following description and the drawings, in which:

FIG. 1A shows a cross-section through the light construction panel of the present invention taken along the line I—I in FIG. 2, and FIG. 1B shows another example of a cross-section through the light construction panel of the present invention taken along the line I—I in FIG. 2, and FIG. 2 shows a top view of the light construction panel.

The light construction panel shown in the drawings consists essentially of an outer frame 1 and a core 2, which both have the same material thickness a. An upper and a lower cover sheet 3, 4 are also provided which cover the frame 1 and the core 2.

If required, sealing elements 5, for example a solid wood glued member, are also provided on the front edges of the light construction panel. Furthermore, cover veneers 6, 7 can be provided on one or both sides of the light construction panel, and are applied to the upper or lower cover sheet 3, 4 and, as the case may be, to the sealing element 5.

The core in turn consists of an inner part 2a, which is covered by an upper and a lower sealing layer 2b, 2c. The inner part 2a is preferably made of a cellulose-containing material and is formed for example by a honeycomb cardboard sheet.

The upper and lower cover sheets 3, 4 and also the sealing layers 2b, 2c of the core 2 are advantageously produced from the same material. Plywood sheets may be considered in particular here as the material. However, metal layers, plastic layers or veneer layers are also conceivable. A further possible material is biocomposite material.

The thickness of the upper and lower sealing layer 2b, 2c of the core should be at least 1 min, preferably at least 2 mm. The thickness of the upper and lower cover sheet 3, 4, on the other hand, should be at least 3 min, preferably at least 4 min.

For the purpose of prestressing of the light construction panel, the upper and lower cover sheet 3, 4 and/or the upper and lower sealing layer 2b, 2c have a different rigidity or, in the case of the same material, a different thickness. FIG. 1A shows the case in which the different rigidity is used, and FIG. 1B shows the case in which the different thickness is used. As a result, during gluing, for example at a temperature of 60° C., the effect is produced that the less rigid or thinner cover sheet or sealing layer can expand more, and as a result, a bowing of the light construction panel to the thinner cover sheet or thinner sealing layer is produced.

As a result the light construction panel is prestressed. By a suitable choice of the different rigidities or thicknesses of the cover sheets or sealing layers the light construction panel can be prestressed in such a way that its bowing is equalised again upon loading.

In the tests on which the invention is based, inter alia a light construction panel with the following thicknesses of the individual layers was tested: upper cover sheet 3: 5 mm, lower cover sheet 4: 5 mm, upper sealing layer 2b: 2 mm and lower sealing layer 2c: 3 mm.

In the static testing of this light construction panel it was shown that by comparison with conventional light construction panels it has a substantially less persistent deformation. In a sample sheet with the dimensions 1800×800×33 min the static testing was carried out according to DIN 4454 WH-Standard. In this case the table was loaded centrally with 75 kg for seven days. Then after 30 minutes resting time the persistent deformation was measured, which should not exceed 3.5 mm according to the DIN standard. Relative to the unloaded state a persistent deformation of only 0.46 min was produced after seven days. If this test is carried out on conventional light construction panels, values of 1.6 to 5 mm are produced for the persistent deformation.

Therefore the light construction panel described above is distinguished by a particularly high stability and an extremely low persistent deformation. It has also been shown that the transition from frame to core does not show on the surface of the panel.

What is claimed is:

1. A light construction panel, comprising:
   an outer frame;
   a core, the outer frame and the core having the same material thickness: and
   an upper cover sheet and a lower cover sheet which cover the outer frame and the core;
   wherein the core consists of an inner part made of light construction material and an upper sealing layer and lower sealing layer; and
   wherein, for the purpose of prestressing of the light construction panel, the upper and lower cover sheets each have rigidity different from one another and/or thickness different from one another.

2. A light construction panel, comprising:
   an outer frame;
   a core, the outer frame and the core having the same material thickness; and
   an upper cover sheet and a lower cover sheet which cover the outer frame and the core;

wherein the core consists of an inner part made of light construction material and an upper sealing layer and a lower sealing layer; and wherein, for the purpose of prestressing of the light construction panel, the upper and lower sealing layers each have rigidity different from one another and/or thickness different from one another.

3. A light construction panel as claimed in claim 1 wherein the inner part is made of a cellulose-containing material.

4. A light construction panel as claimed in claim 1 wherein the inner part is formed by a honeycomb cardboard sheet.

5. A light construction panel as claimed in claim 1 wherein the cover sheets and the sealing layers are produced from the same material.

6. A light construction panel as claimed in claim 1 wherein the cover sheets and/or the sealing layers are formed by plywood sheets.

7. A light construction panel as claimed in claim 1 wherein the cover sheets and/or the sealing layers are formed by metal layers.

8. A light construction panel as claimed in claim 1 wherein the cover sheets and/or the sealing layers are formed by a veneer layer.

9. A light construction panel as claimed in claim 1 wherein the cover sheets and/or the sealing layers are formed by a plastic layer.

10. A light construction panel as claimed in claim 1 wherein the cover sheets and/or the sealing layers are made of biocomposite material.

11. A light construction panel as claimed in claim 1 wherein the frame is made of wood, particularly plywood.

12. A light construction panel as claimed in claim 1 wherein at least the upper cover sheet is provided with a veneer.

13. A light construction panel as claimed in claim 1 wherein the upper and lower cover sheets are each provided with a veneer.

14. A light construction panel as claimed in claim 1 wherein the thickness of the upper and lower sealing layers of the core is at least 1 mm.

15. A light construction panel as claimed in claim 1 wherein the thickness of the upper and lower cover sheets is at least 3 mm.

16. A light construction panel as claimed in claim 1 wherein for the purpose of prestressing of the light construction panel, the upper and lower sealing layers each have rigidity different from one another.

17. A light construction panel as claimed in claim 1 wherein for the purpose of prestressing of the light construction panel, the upper and lower sealing layers each have thickness different from one another.

* * * * *